United States Patent [19]

Stevenson

[11] 4,258,903
[45] Mar. 31, 1981

[54] SPRING-LOADED VALVE ACTUATOR

[75] Inventor: Irving C. Stevenson, San Francisco, Calif.

[73] Assignee: Thomas A. Short Co., Oakland, Calif.

[21] Appl. No.: 130,726

[22] Filed: Mar. 17, 1980

[51] Int. Cl.³ .......................... F16K 5/00; F16K 5/06
[52] U.S. Cl. ..................................... 251/313; 74/523; 74/543
[58] Field of Search .................. 74/523, 543; 251/292, 251/313, 336, 294

[56] References Cited

U.S. PATENT DOCUMENTS

| 138,580 | 5/1873 | Pigot | 251/313 |
|---|---|---|---|
| 443,326 | 12/1890 | Leverich | 251/313 |
| 772,874 | 10/1904 | Donaldson | 251/313 |
| 3,360,234 | 12/1967 | Thorburn | 251/294 |
| 3,382,733 | 5/1968 | Miller et al. | 251/313 |
| 3,513,716 | 5/1970 | Evans | 74/543 |
| 3,690,195 | 9/1972 | Wilfert | 74/523 |
| 3,903,679 | 9/1975 | Sorenson et al. | 74/523 |
| 4,075,907 | 2/1978 | Petrzelka | 74/523 |

FOREIGN PATENT DOCUMENTS 398432  2/1974  U.S.S.R. ................................. 251/313

Primary Examiner—Martin P. Schwadron
Assistant Examiner—H. Jay Spiegel
Attorney, Agent, or Firm—Owen, Wickersham & Erickson

[57] ABSTRACT

A spring-loaded valve actuator assembly having a hollow handle containing a compression spring urged against a movable piston attached to one end of a cable such that the handle remains in the valve-shut position when the handle is at rest. The other end of the cable is secured to the valve housing at an anchor adjacent to an arcuate guide and is in tension at all times to provide spring compression that normally urges the handle toward the shut position. The handle is connected to a rotatable ball valve contained in a valve housing situated in a conduit pipe fluid line, so that it can rotate the ball valve from the full closed to the full open position. As actuating force on the handle is decreased, the handle moves automatically toward its biased shut position because of the stored compression force of the spring which is constantly exerted against the piston inside the handle.

5 Claims, 4 Drawing Figures

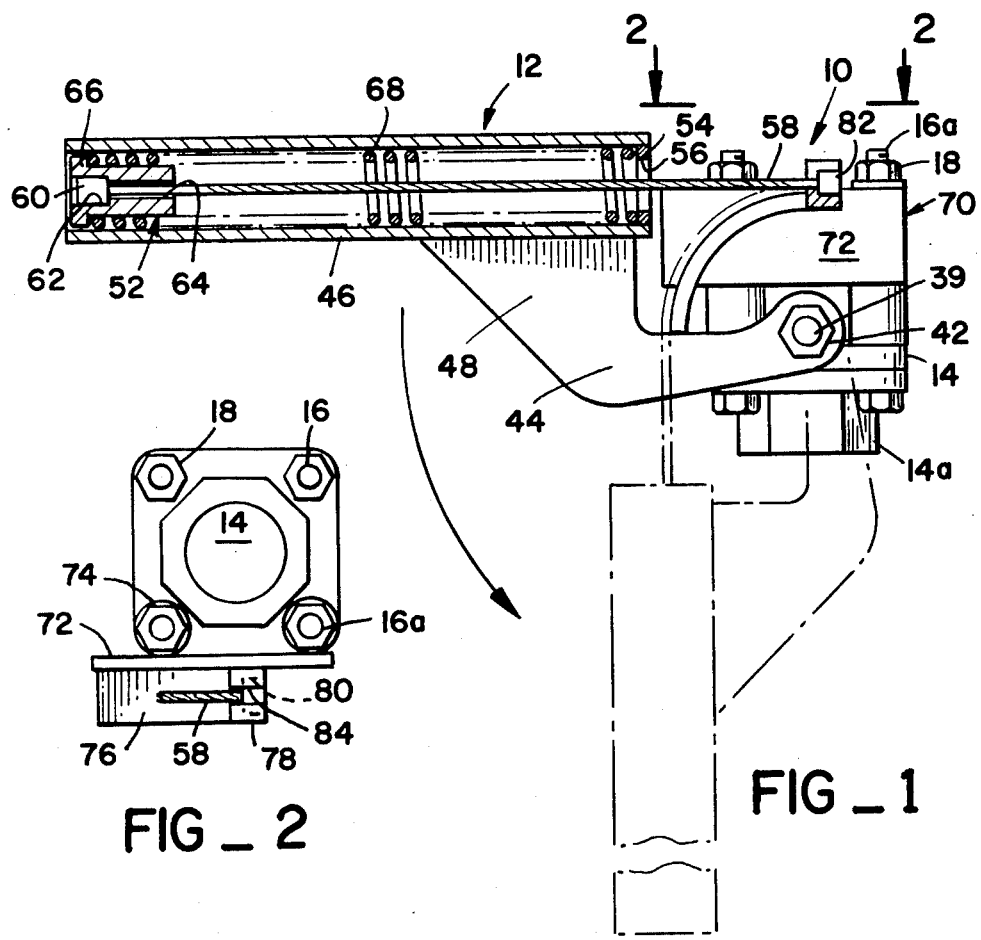
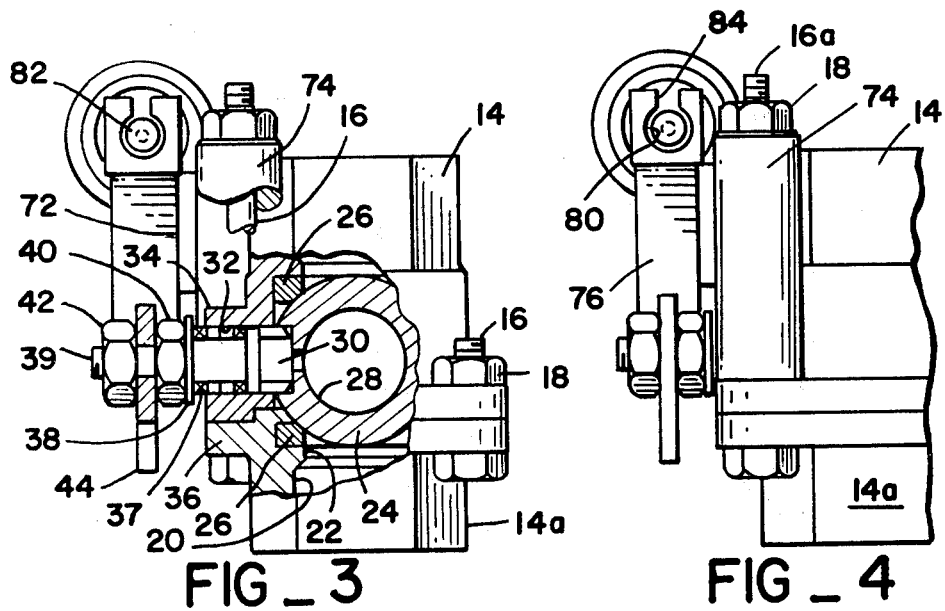

SPRING-LOADED VALVE ACTUATOR

BACKGROUND OF THE INVENTION

This invention relates to flow control valves for fluid conduit systems and more particularly to an improved automatically self-closing valve.

In many fluid conduit systems, it is essential to use valves that can be opened manually but are otherwise biased to the fully closed position, thereby preventing any valve from being inadvertently left open after actuation. Heretofore, various attempts have been made to provide a suitable self-closing valve, but in general, such prior art devices were relatively complex and often unreliable and/or difficult to operate. Other devices, such as the flush valve shown in U.S. Pat. No. 3,360,234, failed to provide adequate intermediate flow control between the full open or full closed positions, a valve function that is vital in many fluid conduit systems. The present invention provides an automatically self-closing valve that solves the aforesaid problems.

BRIEF SUMMARY OF THE INVENTION

It is, therefore, a general object of the present invention to provide an improved self-closing flow control valve that solves the aforesaid problems of prior devices.

Another object of the present invention is to provide a valve with a handle which is biased shut by a spring-loaded mechanism such that release of the force holding it open will automatically result in the handle moving itself back to the quiescent position with the valve closed.

Another object of this invention is to provide a spring-loaded valve actuator with simple construction and reliable operation.

Another object of the invention is to provide a valve actuator which will remain closed unless actuated, will open the valve gradually in direct proportion to the force applied to the actuator, and which will automatically return itself and the valve to the shut position once the actuating force is removed.

A more specific object of the present invention is to provide in combination with a fluid control valve a spring-loaded handle for opening and automatically closing the valve. The handle comprises a hollow tube with a spring contained therein for substantially its full length, and located along the centerline of the tube. Within the tube, the cable is attached to a movable piston that bears against one end of the spring and at its other end, the cable extends outside the handle and is retained by a fixed anchor mounted on the valve housing. Between its ends, the cable extends over and is held in place by an arcuate guide. When the handle is moved angularly about its pivot point from its closed to its open position, the cable compresses the spring as the valve is opened. Yet, because of the guide, the cable constantly remains in the centerline position within the handle, and because the cable never touches any other part of the valve structure, it does not kink or abrade during cycling, but pulls directly on the spring to store a maximum of spring force for automatic return to the closed position. Therefore, the valve actuator is highly reliable and durable and in fact "fail-safe".

Other objects, advantages and features of the invention will become apparent from the following detailed description of one embodiment thereof, presented in conjunction with the accompanying drawing.

BRIEF DESCRIPTION OF THE DRAWING

FIG. 1 is a view in side elevation of a valve actuator for a ball valve according to the invention, with its handle shown in section in the closed position on the valve housing and with the handle shown in the fully open position by broken phantom lines;

FIG. 2 is a fragmentary view in section taken along line 2—2 of FIG. 1;

FIG. 3 is an enlarged end view of the valve housing and actuator of FIG. 1, showing the valve in its closed position with portions of the valve housing broken away.

FIG. 4 is an enlarged fragmentary view of the valve housing and actuator similar to FIG. 3.

DETAILED DESCRIPTION OF EMBODIMENT

With reference to the drawing, FIG. 1 shows a rotary type shut-off valve 10 for a fluid conduit in combination with a self-closing valve actuator 12 according to the present invention. The valve actuator is essentially a handle that enables the valve to be manipulated manually from its closed to its open position, but when opened and then released, it will be automatically biased to the closed position. In FIG. 1, the valve actuator is shown in its closed position with dotted lines showing it in the open position.

In the embodiment shown, the valve 10 comprises a pair of valve housing members 14 and 14a with abutting flange portions held together by machine screws 16, 16a and nuts 18. The outer end portion of each housing member has a bore 20 with internal threads and a multi-flatsided exterior to facilitate connection with a fluid conduit or pipe (not shown). The bore of each housing member connects with an enlarged bore section that forms a central chamber 22 having a greater diameter within which is a spherical valve member or ball 24. A pair of elastomeric rings 26 are seated at opposite ends of the valve chamber to seal around the valve member. A transverse bore 28 extends diametrically, completely through the valve member, so that when it is aligned with the central axes of the valve housings, full flow through the connected conduit is provided. Conversely, when the valve member is rotated 90°, its transverse bore 28 will be blocked from the conduit and no flow can occur.

Fixed to and protruding from one side of the spherical valve member 24, as shown in FIG. 2, is a cylindrical valve post 30 which is attached thereto in such a manner that both will turn together as one element. This valve post extends through a bore 32 formed by bearing-like portions 34 and 36 extending from the two adjacent housing members 14 and 14a. Along most of the length of the valve post, its diameter is somewhat less than that of the bearing bore 32 so that an annular space around the post is provided for a suitable sealing ring or packing 37 which may be of any suitable elastomeric or plastic material. A washer 38 on the valve post is provided to retain the sealing ring in place.

Outwardly from the washer, the valve post has a threaded end portion 39 of lesser diameter that retains a pair of nuts 40 and 42. The inner nut 40 is tightened against the washer 38, and the outermost nut 42 is tightened against one end of a handle arm 44 located between the two nuts, the threaded portion 29 of the valve post 30 extending through a hole in the handle arm.

As shown in FIG. 1, the handle arm 44 which is preferably formed from a sheet of flat, rigid material of uniform thickness, has an angular shape and extends from the valve post to a tubular member 46 forming the cylindrical handle. The end edge of a widened end portion 48 of the arm 44 is fixed to the outer surface of the handle preferably along a line that is parallel with its longitudinal axis.

The tubular handle member is made of a rigid material and of a length sufficient to provide ample gripping surface for an operator's hand and within this handle member is a movable piston 52. At the inner end of the tubular handle is an annular end member 54 with a central opening 56 for a cable 58 that extends through the handle coincident with its centerline axis. Within the handle, this cable is fixed firmly to the piston 52 by suitable means. Preferably, the cable is provided with an enlarged cylindrical nub 60 that is swaged to its outer end, and this nub fits within a recess 62 at the outer end of the piston. A slot 64 for the cable extends from the recess to the inner end of the piston. The outer end of the piston also has an integral flange 64 whose diameter is greater than the main body of the piston but slightly less than the inside diameter of the handle. Extending between this piston flange and the annular end member 54 at the inner end of the handle is a partially compressed coiled spring 68. Thus, even in the closed position of the handle, as shown in FIG. 1, the spring acts to force the piston 52 toward the outer end of the handle and thereby maintain tension on the cable 58.

The inner end of the cable is attached to the valve housing by means of an anchor member 70 which is attached to and extends from one side of the housing member 14. This anchor member comprises a plate 72 to one side of which are fixed (as by welding) a pair of sleeve members 74. Two elongated housing screws 16a which extend through the adjacent flange of the housing members 14 and 14a, as shown in FIGS. 3 and 4, also extend through these sleeve members. The nuts 18 on these screws thereby hold the anchor plate firmly in place. This arrangement enables the anchor member to be readily mounted on a valve housing without changing any parts on it other than the screws 16a.

Integral with, or fixed to the cable anchor plate is an arcuate guide member 76 which is also made of rigid material. The contour of this guide member follows approximately 90° of arc for a circle whose center is the axis of the valve post 30 and whose radius is the distance from this latter axis to the outer surface of the cable 58 when the handle 46 is in its closed position. (FIG. 1). Preferably, the guide member 76 has a width at least three times greater than the cable diameter and its centerline along its arcuate surface is in the same plane as the central axis of the tubular handle 46.

Attached to the end of the arcuate guide member which is farthest from the inner end of the tubular handle, is a retaining member 78 for the inner end of the cable 58. This retaining member has a cylindrical recess 80 which is sized to receive a nub 82 on the inner end of the cable, and a slot 84 for the cable extends from the recess. The centerline of this recess and slot is coincident with the centerline of the cable as it extends tangentially from the arcuate guide member 76 and along the centerline of the tubular handle 46 when the latter is in the closed position.

The beneficial results of the aforesaid combination of elements which are derived during operation of the valve 10 by the valve actuator 12 may be readily understood by reference to FIG. 1. In its closed position, the coiled spring 68 within the handle 46 maintains a constant tension on the cable 58, thereby urging it in the clockwise direction and the closed position. When the valve is to be opened, the operator moves the handle approximately 90° in the counterclockwise direction to the position shown by the dotted lines. This rotates the valve ball 24 to its open position within the chamber 22 of the valve housing. As this handle movement occurs, the cable is forced to extend around the arcuate guide member 76, thereby causing the piston 52 to be pulled against the compression spring within the handle. Since the guide member is precisely formed as the arc of a circle and is properly positioned on the valve housing, the cable within the handle (and including a portion extending just outside of it) remains aligned with the axis of the handle 46. This results in a constant tension on the cable and a constant maximum compression force on the spring, without the cable rubbing or chafing on any edges of the handle or valve housing. Thus, when the handle is released, the maximum stored energy of the compressed spring is available to assure full closure of the handle. In addition to this positive, automatic valve actuation, the elements, as described, obviously operate with a minimum of wear and thus the device has a high degree of reliability and durability. To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination with a valve having a housing adapted for connection to a fluid conduit with a valve member in said housing that blocks fluid flow in one position and allows full flow when rotated 90° about its axis, said valve member having a valve post aligned with said axis and extending radially from the valve member and the housing, an automatic shutoff actuator assembly comprising:

an elongated tubular handle adapted to be gripped by an operator;
   a movable piston within said handle;
   a cable attached at one end to said piston extending from said handle and means for anchoring said cable at its other end to said valve housing;
   a coiled spring within said handle partially compressed between said piston and stop means at one end of said handle so as to maintain tension in said cable;
   an arcuate guide on said housing positioned to bear against one side of said cable and thereby maintain the cable in alignment with the longitudinal axis of said handle as it is moved from the valve closed to the valve open position; and a handle arm having one end fixed to said handle and its other end fixed to said valve post of said rotary valve member; whereby when said handle is in the closed position, the initial spring compression producing cable tension tends to keep the valve closed, and when the handle is moved to the open position, spring compression and cable tension is increased so that upon release, the handle will be forcefully biased to its valve closed position.

2. The valve actuator assembly as described in claim 1 wherein said means for anchoring said cable comprises a slotted retainer adjacent said arcuate guide and aligned with the center line of said tubular handle in its valve closed position.

3. The valve actuator assembly as described in claim 2 wherein said cable anchoring means is integral with one end of said arcuate guide means, said guide means being positioned on said housing so that a tangent line from its other end is substantially aligned with the center line of said handle in its valve open position.

4. The valve actuator assembly as described in claim 2 wherein said means for anchoring said cable to said housing includes a mounting plate fixed to said arcuate guide, a pair of sleeves fixed to said plate and adapted to receive screws attached to said housing.

5. The valve actuator assembly as described in claim 1 wherein said cable has a swaged nub at each end, one said nub being seated within a recess in said piston and the other said nub being seated within a recess within said slotted retainer.

* * * * *